FIG. 2A.

April 11, 1961  J. S. CHRISTIE  2,979,066
COLOR CONTROL OF LIQUIDS
Filed Sept. 17, 1956  5 Sheets-Sheet 3

FIG.2B.

INVENTOR:
JOHN S. CHRISTIE
BY Howson & Howson
ATTYS

April 11, 1961   J. S. CHRISTIE   2,979,066
COLOR CONTROL OF LIQUIDS
Filed Sept. 17, 1956   5 Sheets-Sheet 4

INVENTOR:
JOHN S. CHRISTIE
BY
Howson & Howson
ATTYS.

United States Patent Office 2,979,066
Patented Apr. 11, 1961

2,979,066
COLOR CONTROL OF LIQUIDS
John S. Christie, Oreland, Pa., assignor to The Proctor-Silex Corporation, a corporation of Connecticut
Filed Sept. 17, 1956, Ser. No. 610,159
21 Claims. (Cl. 137—3)

This invention relates to the art of controlling the color of liquid mixtures. It relates to a system for mixing liquids and a method of accomplishing the mixture.

It is often desirable to mix liquids of component colors to form a mixture of a different color. Where the mixture is to be used to produce colored articles, particularly articles which are to be sold in pairs or sets, it is desirable to have the color of the mixture the same over an indefinite period. As a consequence, it has been usual to employ skilled workers to observe and maintain constant the color of mixtures over the period of operation. Even though these individuals are oftentimes quite skilled, the system is subject to human inadequacies and particularly to a tendency for an observer to tire after a period. Moreover, it is difficult for one to maintain a constant watch and to vary the mixture exactly correctly by adding the necessary quantities of each of the particular components used to make the mixture. Consequently, it is common for the colored objects manufactured from liquids mixed in this manner to vary within tolerances which can be visibly detected by comparison of one article with another.

The present invention is intended to provide a system and a method which will eliminate the tedious job of color monitoring a mixture visually and which will be capable of eliminating the necessity of guessing from the technique of adding components to properly color the mixture. Thus, it is possible using the system or the method of the present invention to obtain any number of articles of essentially the same color or which are so close to one another in color that any variation could be detected only by one highly skilled in color comparison and then only upon careful observation.

In its broadest aspects, the present invention relates to a system for mixing colored liquids in a mix chamber. A plurality of tanks are provided each to contain a liquid of different component color. A colorless dilutent supply is also provided. Conduits connect the tanks and the dilutent supply to the mix chamber in order to supply the different colored liquids to said chamber and a valve is provided in each conduit for controlling the flow of the liquid from its associated tank to the mix chamber. A color monitoring device coupled to the mix chamber is adapted to sequentially examine the constituent color components of the mixed liquid and to respond in like sequence to any deviation from the proper amount of each component color needed to make the standard color. Separate couplings are provided between each valve and the color monitoring device whereby the response of the monitoring device to any deviation from any component color adjusts the valve in the conduit leading from the supply of the liquid required to correct the color deviation.

The method relates to the obtaining of a colored mixture from fluids of component colors and it comprises the continuous monitoring of the color of the mixture to determine deviations of each of the component colors in the mixture from the corresponding color component density of the standard and feeding alternatively into the mixture, as required, dilutent and component fluids of such components as deviate from the components standard until the deviation is corrected.

In its broadest terms of inclusion, the system and method of the present invention are applicable to any type of liquid which is mixed from components in order to obtain a desired color defined by a standard. An example of a use of this invention in mixing liquids is the production of rayon dopes from which colored rayon threads are formed. Perhaps a more widely used application of the present invention is the preparation of dyeing mixtures. Whether used for dyeing or for other purposes, the system is based on monitoring of the mixed fluid to detect deviations of the component colors therein from the standard. It is the function of the system to immediately detect and correct any deviation from the standard and it may do this in a variety of ways, some of which will be described hereafter. This invention makes it possible to maintain the color within very narrow limits over indefinitely long periods. The monitoring is done automatically, preferably using one of my monitoring systems described in my U.S. patent applications Serial Nos. 493,229, now Patent No. 2,934,172, and 493,127 now Patent No. 2,928,310, both filed March 9, 1955.

The system described may be applied to correct any deviation whether brought about by an excess or deficiency of the component colors. In large volume fields of application, such as the monitoring of dyes, there is always a deficiency of the dye components so that color components must always be added to achieve the standard color. In some applications, however, it will be necessary to add dilutent to dilute an excess of the color components, which is perhaps the result of evaporation of the solvent, for example. Although it can be done in other ways, perhaps the most convenient way of correcting the situation, where any one of the color components becomes excessive, is to prevent the addition of all the color components and add dilutent until all components are deficient. Thereafter, all color components can be added as required by the system hereafter described in detail or any other suitable system.

In the case of dyes, it may be necessary to add non-dyeing colored materials to the dyes for specific purposes. For example, non-dyeing colored dispersing agents are commonly used with dyes. As far as possible, it is desirable to employ colorless non-dyeing materials, but where such non-dyeing materials have a characteristic color it is possible to compensate for their influence on the measurement of the working dyes. Generally speaking, there are three ways of operating the system with full correction for non-dyeing colorants, to wit: maintaining the amount of non-dyeing constant by constantly disposing of a part of the whole solution or mixture at such a rate that an equilibrium condition is established; constantly adjusting the standard to compensate for the non-dyeing in accordance with the rate of solution; or adjusting the standard in accordance with the response on means detecting the non-dyeing material.

Figs. 2a and 2b illustrate in more detail portions of the system of Fig. 1. Figs. 2a and 2b should be considered together and placed side-by-side with Fig. 2a to the left;

Figure 1:
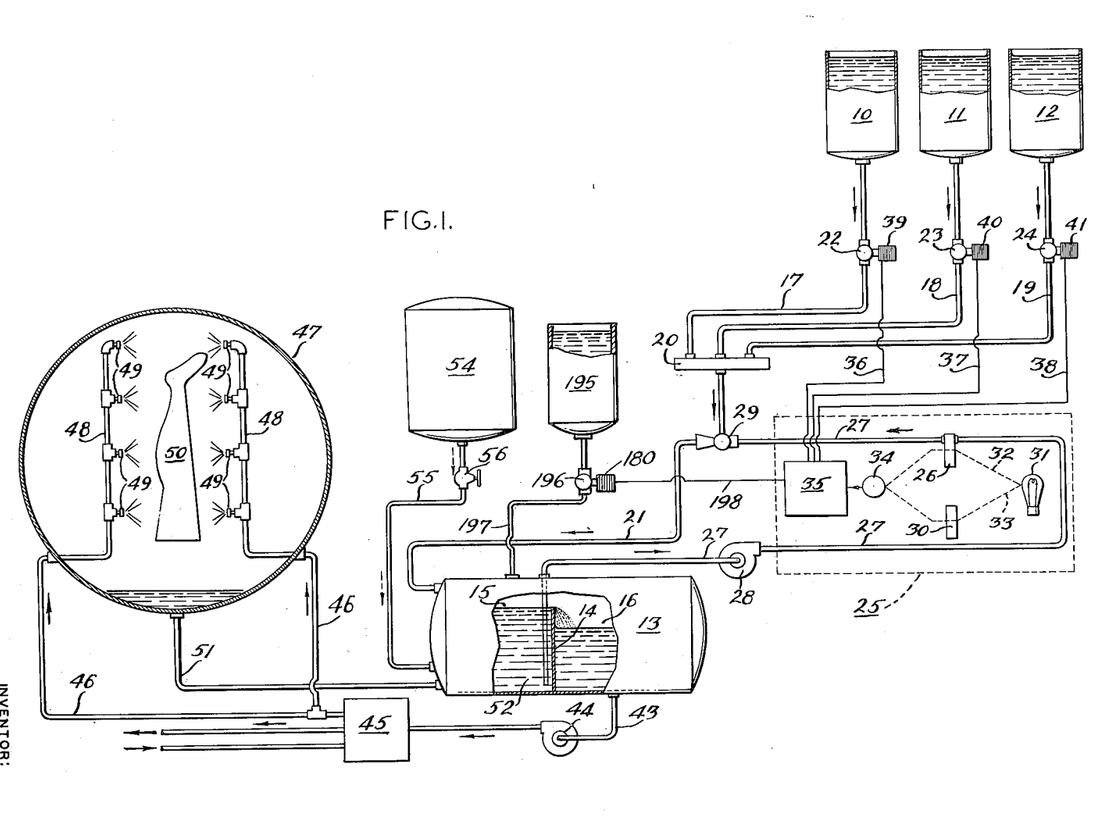
Fig. 1 illustrates somewhat schematically a system for dyeing fabrics which embodies the present invention.

Referring to Fig. 1, the system illustrated is used to mix aqueous dyes to a color which is held virtually constant by reference to the standard. Control of the color of the mixed dye in this manner permits uniform coloring of an indefinite number of articles handled over a period of time.

In Fig. 1, the tanks 10, 11 and 12 are arranged to contain dye concentrates of the component colors to be mixed. For example, tank 10 may contain red dye, tank 11, yellow dye, and tank 12, blue dye. A tank 13 is subdivided by a lateral wall 14 into a mix chamber 15 and a supply chamber 16. The dyes from tanks 10, 11 and 12 are fed from the dye tanks to the mix chamber 15 by pipes or conduits from each dye tank. For example, conduit 17 leads from tank 10, conduit 18, from tank 11 and conduit 19, from tank 12. These conduits are brought together in a manifold 20 from which the dye components are fed together into tank 13 through conduit 21. In each of the conduits or pipes are valves 22, 23 and 24 which control the flow of the red, yellow and blue dye solutions, respectively, through their conduits and into the mix chamber 15. The dye solutions may be eductor fed as shown or pump fed to tank 13. The dye solutions of the component colors are thoroughly mixed together and with water in the mix chamber, and the resulting mixed dye is continuously checked by a color monitoring system 25, which is schematically represented by the part of such a system shown within a dashed line enclosure. Preferably, monitoring is accomplished by use of sample cell 26 connected to the mixing chamber by conduit 27 through which the mixed dye is passed. The path of flow is from mixing chamber 15, through conduit 27 under the pressure of motor driven pump 28 into sample cell and thence, through eductor 29, whence it is fed back into the mixing chamber 15. The eductor 29 tends to provide a pump action drawing the component dyes from the manifold which may be at super atmospheric pressure and simultaneously achieving a pre-dilution of these dyes before the mix chamber. The sample in cell 26 is continuously flowing. The cell itself is preferably transparent and colorless and the color of its contents is compared with a standard 30. A common light source 31 may supply independent beams 32 and 33 to pass through sample cell 26 and standard 30 for comparison purposes using the techniques taught by my U.S. patent application Serial No. 493,229, filed March 9, 1955. Alternatively, a color monitoring system such as the one disclosed in my application Serial No. 493,127, filed March 9, 1955 may be used. It is possible to compare these beams by means of a photosensitive light responsive element 34 which is employed in accordance with the teaching of the above-identified applications. This comparison produces a sequence of responses so that the response for each color of the component dyes is proportional to the deviation of that component dye color in the mix from the color of that component in the standard. The response for each color can be isolated by response device 35 so that each can be used for a separate purpose. The response device 35 is coupled to valves 22, 23 and 24 by coupling means 36, 37 and 38, respectively, which are arranged so that coupling 36 responds only to deviation from red, coupling 37 responds only to deviation from yellow and coupling 38 responds only to deviation from blue. In this case, the coupling means may be electrical leads which are selectively coupled to a power supply to actuate solenoids or servo motors 39, 40 and 41 which act to open valves 22, 23 and 24. Response device 35 is so calibrated that it opens each of the various valves to admit a fixed small amount and continues to admit like amounts each time its particular color is compared in sequence until deviation of that particular component color from the standard is rectified.

In addition to the tanks containing dye there may be provided a tank 195 containing a dilutent for reducing the intensity of the dye mixture. The flow of the dilutent into mix chamber 15 of the tank 13 is controlled by valve 196 in the flow line 197 connecting the tank and mix chamber. Actuating the valve 196 is a solenoid 180 which responds to a signal from the responsive device 35 should the responsive device indicate that dilutent is required.

Certain non-dyeing constituents may be necessarily employed in the dye mixture and it is sometimes necessary to use colored dispersion agents. For example, one commonly used dispersion agent is of yellow color, and were no correction made to allow for the color of this material in the monitoring system the dye would be deficient in its yellow dye component so that the dyed articles would not be dyed the color of the standard. However, using the standard disclosed in my application Serial No. 493,229, for example, it would be possible to increase the intensity of the yellow component in the standard by the amount of yellow contributed by the non-dyeing colored material and, thus, obtain the desired color. In a continuing process of dyeing, if colored non-dyeing materials must be used, it is desirable to use one of the systems previously described. By one of these systems it is possible to add a constant make-up of clear solvent (water) and discharge an equal portion from the main circulating system. Since this will tend to cause any constantly added contaminant (whether it is carried in with the replenishment dyes, as dispersing agents are, or whether it comes from some other source, such as colored matter from the materials to be dyed) to reach an equilibrium, a calculable amount of the contaminant may be included in the initial mixture. This amount, of course, is equal to the amount of contaminant which would build-up in the system when it reached equilibrium, and therefore, the effect of the contaminant on the color monitoring device is constant and can be compensated by adjustment of the standard to a density which corresponds to the constant density of the non-dyeing material added to the desired standard color.

Alternatively, it is possible in the use of standards as described in my two applications above mentioned to adjust the standard in response to a time-operated device which operates whenever the system is operating. In accordance with the present invention, such an adjustable standard can be moved linearly or in accordance with the graphical representation of any other rate of increase in response to a cam action or the like on the adjusting drive, in order to compensate for the constant build up in non-dyeing colored material.

Also possible is a system for measurement of non-dyeing ingredient (or contaminant) by transmission of energy outside the visible spectrum. Most organic, also inorganic compounds have absorption bands somewhere in the ultra-violet or infrared portions of the spectrum, therefore, a filter (wavelength selective device, similar to the filters used in the visible portion of the spectrum for monitoring dyes) can be selected for use in the same or a similar monitoring instrument which will make the monitor sensitive to the concentration of the contaminant. This information can be manually, or electrically used to vary the "standard" of any (or all) dyes with whose measurement in the visible spectrum, the contaminant interferes.

Because of the arrangement of the mixing chamber 15, which permit thorough mixing, the supply of mixed dye in chamber 16 is kept uniformly the color of the standard, and it may be fed through line 43 in the bottom of chamber 16 through a pump 44 and through a heater system 45 which heats all increments of the dye mixture to the same temperature through branches 46 which extend into dyeing chamber 47 and, thence, to arms 48 and orifices or spray nozzles 49. Spray nozzles 49 are arranged to uniformly coat articles being dyed, such as, stockings 50 which may be arranged on forms within the chamber. A gravity feed line 51 is provided from the bottom of the chamber back to tank 13 and specifically to the bottom of mix chamber 15. Thus, dye which, after spraying accumulates in the bottom of the tank will be fed back to the mix chamber for remixing and re-use, thereby saving some of the waste of dye which would otherwise accompany spraying. If this mixing causes the color of the mixed dye to deviate from the standard the sample passing through cell 26 will indicate this and the monitoring system 25 will cause adjustment of the valves 22, 23 and 24, respectively, so that a proper proportion of each color to correct the error or deviation from the standard will flow to the mix chamber.

A pre-mix chamber 54 is also provided so that when it is desired to change color, it is possible to pre-mix a batch of dyes in advance. Then the mix chamber and/or supply chamber may be emptied and the mixture fed from chamber 54 through line 55 into chamber 15 upon the opening of valve 56. In this manner no time is lost during the dyeing process.

Figure 2A:
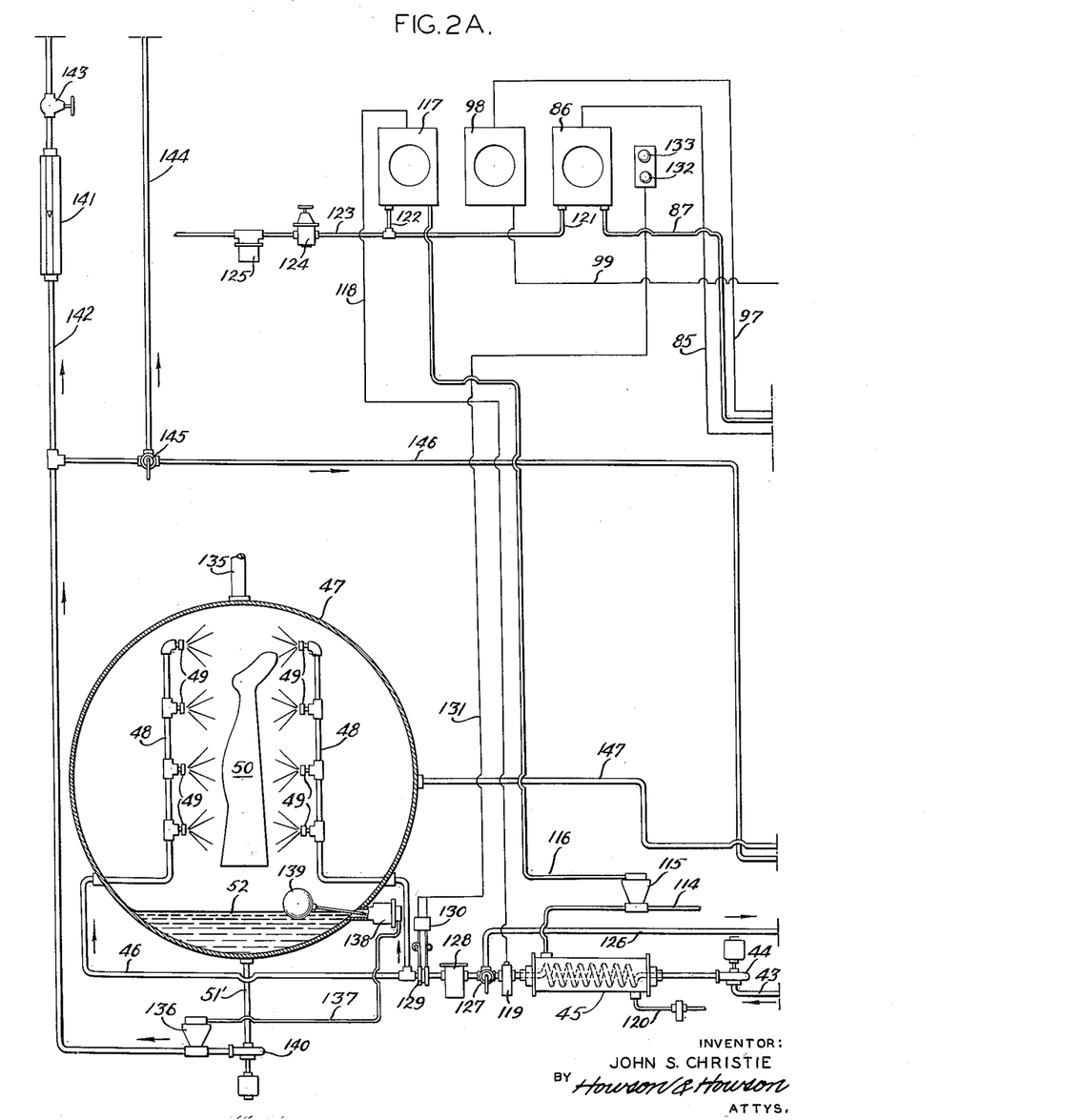
Figure 2B:
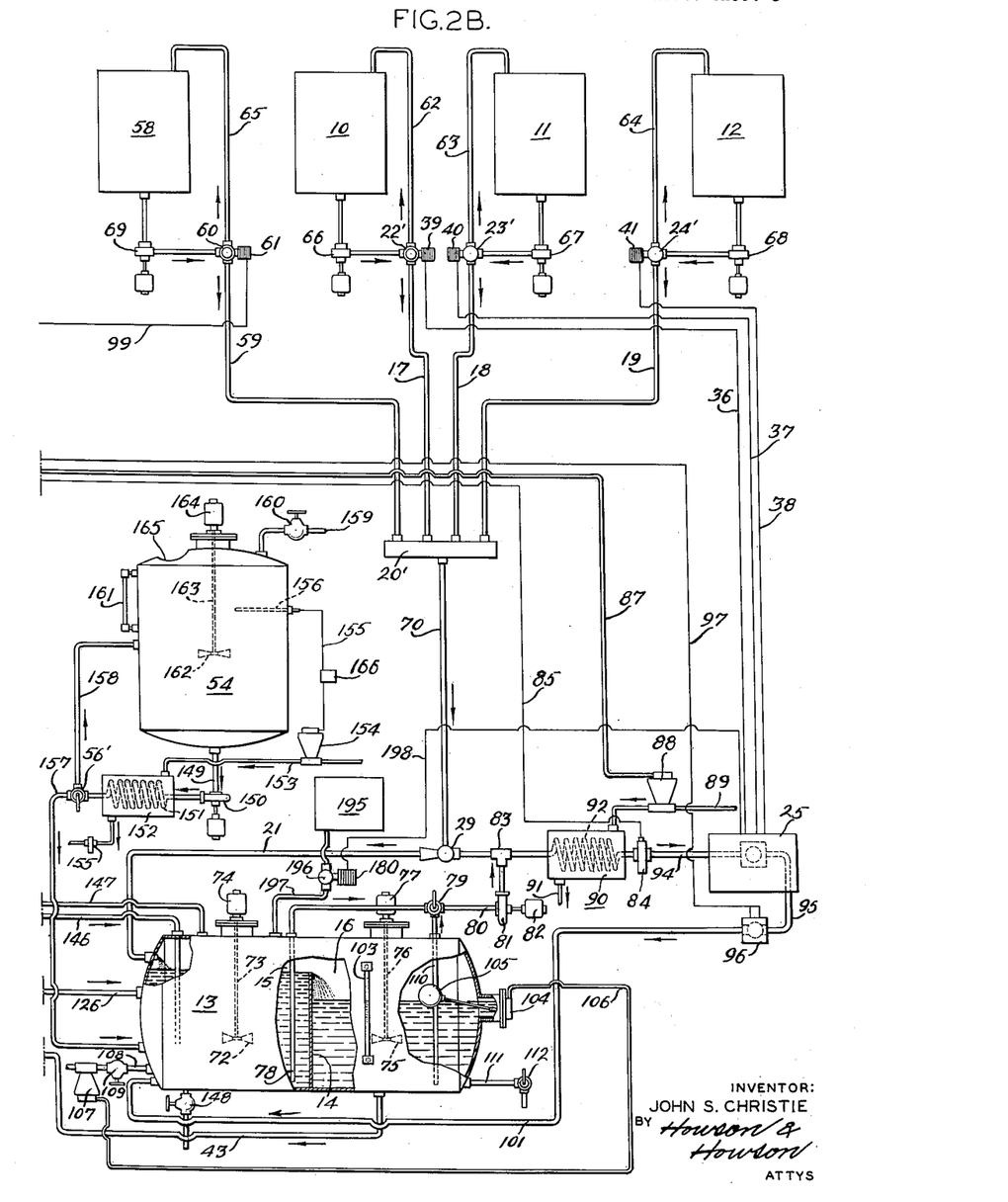

In Figs. 2a and 2b the system except for the monitoring device 25 is shown in greater detail than in Fig. 1. In most cases the similar parts have identical numbers, but where a structure is modified the same number is used but modified by the addition of a prime thereto.

As shown in Fig. 2b there is provided an additional tank 58 which through conduit 59 feeds into the manifold 20'. The flow through conduit 59 is controlled by a valve 60 which is operated by a solenoid 61. In this instance, solenoid 61 is much like the solenoids 39, 40 and 41. The valves 22', 23' and 24', however, are not simply on-off valves but threeway valves so arranged that flow may be alternatively directed either through conduits 17, 18, 19 and 59 or through return feed conduits 62, 63, 64 and 65, respectively, back to the tank of its origin. Sufficient fluid pressure for returning dye solutions to their respective tanks is provided by means of motor actuated pumps 66, 67, 68 and 69, respectively.

The tank 58 supplies a fluid for controlling the pH of the dye mix. It is necessary to control the pH to whatever is the optimum value for the dyes being used and the material being dyed which may be from a pH of 2 to 14. For example, the proper pH is approximately 7 for acetate dyes on nylon material. Accordingly, if the mixture tends to be acid, a basic fluid should be supplied in tank 58. On the other hand, when the dye mixture tends to be basic, acid should be added, and this is the more usual situation. For example, a phosphoric acid ($H_3PO_4$) solution may be supplied in order to keep the PH of the solution in balance. The neutrality of the solution is particularly critical in the case of synthetic materials such as nylon and, although it is true when dyes used are acetate, the pH is particularly critical when dyes used are acid dyes.

The manifold 20' reduces the flow path of all solutions from tanks 10, 11, 12 and 58 to a single conduit 70. The flow of all dye solutions is drawn through the eductor 29 into tank supply pipe 21 by the action of the flow of liquid from the T 38 which is pumped out of mix chamber 15 and fed back through supply pipe 21 into the upper part of the mix chamber part of tank 13. The eductor tends to draw the dyes into the flowing mixture where they are pre-mixed before reaching mix chamber 15. The dye material within the mix chamber is thoroughly mixed by propeller 72 driven by motor 74 through shaft 73. A similar mixing propeller 75 on the end of shaft 76 and driven by motor 77 is provided in the supply chamber 16 in order to keep the mixture uniform in that compartment. As will be later described, liquid passes from the mix to the supply chamber by overflowing partition 14.

In some instances a dilutent supply 195 is required to reduce the intensity of the dye mixture. The dilutent in the case of water soluble dyes might be clear water for example. The dilutent is fed from tank 195 to conduit 197 upon the opening of valve 196 in response to a signal provided the solenoid 180 from the monitoring system 25.

A conduit supply tube 78 extending from close to the bottom of mix chamber passes through a valve 79 to pump supply conduit 80. A pump 81 driven by motor 82 acts to draw mixed dye solution from the mix chamber through conduit 78 and 80. This dye mixture is pumped to a T 83 which splits the flow so that some of it flows back through eductor 29 in order to pre-dilute the dye solutions flowing through conduit 70 and some flowing toward the color meter 25, as previously described. That part which flows on through the color meter passes through a cooler 90 and temperature detector 84 which may be a thermocouple arrangement, and which is wired by connection 85 to an air supply control 86. This control is arranged to supply in response to a temperature proportional signal a controlled amount of air through a line 87 to a control valve 88 in a cold water supply line 89 which feeds the cooler 90. The cooling water is exhausted from the cooler through line 91. Within the cooler is a coil 92 which is part of the conduit 94 through which dye mixture passes on its way to color meter 25. The arrangement, as will be hereafter described, provides for uniform temperature of the dye mixture passing through color meter 25 through conduit 94. After passing through the sample cell of the color meter 25 the dye flows through a conduit 95 to a cell 96 measuring pH. As the pH will normally tend to be higher or lower than the desired value, provision is made as previously described to maintain a constant predetermined value by addition of acidic or basic solutions. The voltage output signal of the cell 96, which is a function of pH, is fed through double line 97 to pH controller 98. The controller 98 actuates solenoid valve 61 through lead 99 admitting a suitable acid for example phosphoric acid, if the pH exceeds the desired predetermined value, or a suitable base, for example di-sodium phosphate, if the pH becomes lower than the desired value. It is preferable to reduce over correction by allowing the addition of only one increment of corrective solution in any predetermined time interval by means of a timer (not shown). Alternatively, controller 98 may be provided with proportioning action to control a valve in an amount proportional to the deviation of the pH from the desired value. From the cell 96, the fluid flows back through line 101 to the mixing chamber as illustrated.

In the supply chamber, a liquid level gage 103 is provided in order to always be able to visually determine the level of the liquid in the supply chamber. Air control 104 of a type similar to controls 86 and 117 actuated by float position is connected by tubing 106 to an air operated throttling valve 107 in the water supply line 108 in order to operate the valve when water level in chamber 16 drops below the required level. The line 108 may also be closed manually by a valve 109.

A conduit 110 extends through tank 13 from the bottom of the supply chamber 16 to valve 79 which is preferably a three-way valve as shown, so that the sample taken through the color meter may be selected either from the mix chamber or from the supply chamber. The supply chamber also has a conduit 111 which permits drawing off a quantity of mixed dye or emptying the supply chamber 16 in the event that this is necessary. Valve 112 in line 111 is normally kept closed.

Supply line 43 extends from the bottom of supply chamber 16 and is provided with a motor driven pump 44. The supply line through a heater 45, which accomplishes heating by heat transfer from steam supplied from line 114. The flow in line 114 is controlled by a valve 115 which may be remotely actuated by a signal through air pressure supply line 116. The actuating device 117 responds to changes in water temperature in line 43 and to this end is connected by a line 118 to temperature sensing device 119 in line 43. Consequently, the temperature of water in line 43 is effective to regulate valve 115 and determine the amount of heating fluid entering heater 45. The heating chamber 45 is emptied of condensate by line 120.

The lines 87 and 116 controlling valves 88 and 115, respectively, are preferably air pressure lines as previously indicated. Control instruments 86 and 117 supply the air for these valves and, in turn, are supplied by feeder supply lines 121 and 122 from a main supply line 123. The main supply line has its pressure controlled by a pressure regulator valve 124 which is in series with a filter 125.

Beyond the temperature indicator 119 in line 43 there is a three-way valve 127 for the purpose of diverting the dye solution through line 126 back to the mix chamber. Also in the line 43 is a strainer 128 and finally an orifice or Venturi device 129 which is arranged to actuate a switch 130 when a predetermined pressure differential occurs between opposite sides of the orifice due to fluid passing therethrough. The switch is connected by a two wire line 131 to a power supply and a signal device in which there is a red light 132 and a green light 133. The circuitry and pressure settings are arranged so that when more than the minimum desired flow is passing through the line, the switch is actuated to light the green light 133, and when less than the minimum desired flow is passing through the line the switch lights the red light 132. Thus it is always possible to know whether or not the system is operating at an adequate flow rate by the observance of the lights 132 and 133.

The dye tank 47 is advantageously provided with a steam feed 135 in order to increase pressure and to presaturate the goods to be dyed, etc. The exhaust 51' of the tank 47 is provided with an air operated throttling valve 136 connected by air supply line 137 to air control 138 similar to controls 86, 117 or 138 and like 138 actuated by float position of float 139 so that the level of fluid 52 in the chamber 47 will tend to remain relatively constant. A motor driven pump 140 is provided in this particular embodiment in order to return the fluid to the tank. It is possible instead of returning fluid to the tank to exhaust it, and ordinarily a measured part of the fluid is exhausted by passing through a rotameter 141 in line 142. A manually controllable valve 143 is also provided in this line 142. In addition to the rotameter, a waste line is provided and a three-way valve 145 permits diversion of the dye through waste line 144 or return through line 146 back to the mix chamber.

A line 147 extends between the chamber 13 and the chamber 47 to act as a pressure equalizing line so that the pressures of both chambers remain essentially the same.

An extra supply of dye may be mixed in tank 54 so that when it is necessary to change over from one color to the next it is simply necessary to empty the mix tank through valve 148 and thereafter allow the contents of tank 54 to flow into the mix chamber. The fluid is removed from tank 54 through a conduit 149 from the bottom of the tank and is urged by motor driven pump 150 through a coil 151 in a preheater 152 which is supplied steam or other heating media through conduit 153. The temperature of the steam supplied the pre-heater is regulated by a valve 154 in line 153. Line 155 connects the control element of valve 154 to a temperature responsive member 156 within the tank 54 so that the amount of heating due to the flow of steam through the heater is determined by the temperature of the dye mixture in the premixing tank. A three-way valve 56' in the conduit 149 beyond the heater element 151 permits alternative selection of positions to direct a flow of the dye from tank 54 through lines 157 and 158. Line 157 leads to the mix chamber of tank 13 whereas line 158 leads back to tank 54. Water may be supplied through a line 159 which may be closed by a manually operated valve 160. The chamber 54 has a visually read gauge 161 for indicating the level of the liquid therein. Within the chamber is a propeller 162 mounted on shaft 163 and driven by a motor 164 for assuring homogeneous mixture of the fluid contained therein.

In the course of operation of the system shown in Figs. 2a and 2b, the color of the liquid dye mixture in chamber 15 is constantly checked by the color monitoring device 25 previously described in connection with Fig. 1. The liquid mixture must be pumped through the cell continuously at a rate sufficiently fast that the color of the fluid in the cell is for all practical purposes the color of the mixture in chamber 15, and such a rate of circulation is provided by pump 81. In addition to keeping the flow rate of the liquid withdrawn from mix chamber 15 through conduit 78 quite high, it is important to keep the temperature of the sample tested at a constant level since one dye mixture at different temperatures may actually be different colors. Consequently, in the preferred system shown, the temperature of all liquid passing through the test cell of the color monitoring system 25 is reduced by cooler 90 to a predetermined constant temperature. The liquid is preferably cooled rather than being heated for many reasons, such as, the ease in construction of the sample cell, longer life for the pH cell and operation at closer to ambient temperature. In the heat exchanger 90, cold water flows about the coils 92 which contain dye liquid flowing to the color monitoring system. The temperature of the mixture entering the cooler is detected by a thermocouple or other suitable detector 84, and the detector signal, in turn, is fed to the control 86 which in this case actuates a valve in the cold water supply line 89. The warmer the liquid flowing past detector 84 the greater the flow of compressed air which accomplishes the wider opening of the valve, the system being calibrated to produce the necessary degree of cooling for each temperature sensed.

Controller 86, and similar controller 117, are supplied compressed air from line 123 which is kept at a maximum constant air pressure, and this pressure is throttled down by the particular controller in response to the signal fed to it. Thus, the output of the controller in air pressure is proportional to the signal received according to a predetermined pattern as is well known in the art.

The same flowing sample which passes through the cell of the color monitoring system 25 passes through a pH cell 96 which measures the pH of the fluid and produces a signal for controller 98 which in turn may send out a signal to operate solenoid 61 and correct the pH in the manner heretofore described.

The color monitoring system 25 is arranged to sequentially analyze the dye sample in terms of each of the component dye colors and to produce an output signal proportional to the deviation of each component in the tested sample from the standard. The sequence is predetermined so that the proper signal will be used to demand dye of each component color. Each signal is transmitted to the solenoid controlling the three-way valve for its particular tank 10, 11 or 12. Thus, when a particular component dye solution, such as red, for example, is being monitored, a comparison is made between that component of the mixed dye and the corresponding component of the standard and a signal proportional to the deviation is produced. Thus, deviations in the red component of the dye from the red component of the standard when red is being analyzed are caused to produce a signal proportional to the deviation, which energizes the solenoid 39 through connection 36 so that three-way valve 22 is driven into a position in which an amount of red dye solution is permitted to pass through conduit 17 into the manifold and on down conduit 70 to eductor 29. Similar action takes place with regard to the blue and yellow dye solutions and component dye solutions are added as required to correct any imbalance in the color of the mixture as it occurs. It is possible to control the amount of dye added each time the valve is actuated so that dyes are added in proportion to the amount required. However, generally speaking, it is unnecessary to do this because monitoring occurs at such a sufficiently rapid rate that increments of dye may be small, eliminating over correction when any color reaches the proper density in the mixture. If the color intensity becomes too great, by the controlled addition of diluent the intensity can be reduced in many situations.

As previously indicated fluid is drawn from tank 15 through pipe 78 under the effect of pump 81. The flow divides at T 83 and much of it flows through the eductor 29 into conduit 21 and back into tank 15. The dye solutions and pH controlling solutions are fed into the manifold 20′ where they combine to flow together down conduit 70 from which they are drawn into the stream by eductor 29. Thus, the component dye solutions and the pH controlling solutions receive a certain degree of pre-mixing with solution flowing through the conduit 21 before being introduced into the mix chamber 15. Furthermore, once in the mix chamber, the mixing propellor tends to keep the mixture homogeneous. In the course of operation, water is added through line 108, under the control of valve 107, unless hand operated valve 109 cuts off the supply. Since valve 107 is controlled by a switch operated by float 105, valve 107 will not shut off until the mixture in the mix tank 15 has risen to a height above wall 14 and overflowed into supply tank 16 to an extent to raise the level float 105 to a height which will cause shutting off of switch 104. Thereafter, as fluid is drawn off from the supply tank the level will drop and the float switch will close causing actuation of the valve and the addition of more water to the mix chamber 15. The dilution by the addition of water may call for the addition of more dye solution but this will be automatically accomplished since the color of the mixed dye in tank 15 is constantly monitored by color monitoring device 25 and dye is added as needed as previously described. It will be observed that the color of the dye in the supply chamber can also be monitored by putting the three-way valve 79 in its alternative position. However, it is usually preferable to monitor the color of the dye mixture in the mixing chamber.

Dye of the standard color is fed from the bottom of the supply tank 16 through supply line 43 under the pressure of pump 44. Before the fluid is fed to the dyeing chamber 47 it must be heated to a fixed temperature since, as observed in connection with the testing or monitoring, dye may vary at different temperatures. Application of the same color at different temperatures may result in a dyed product of variable color. Consequently, heating to a predetermined temperature at least as high as any temperature which the dye solution would otherwise attain is accomplished by heater 45. Heater 45 is a heat exchanger similar to cooler 90 in that it contains a coil through which a flowing dye solution passes. The coil will be surrounded in this case by steam, rather than cold water, supplied by supply line 114. The supply is controlled by valve 115 which is opened varying amounts to control the rate of flow of steam in response to the water temperature. The opening of the valve 115 is in response to a need for a higher rate of flow of steam through the heat exchanger to heat the dye from a particular temperature to the dyeing temperature. Air pressure to open the valve is supplied from controller 117, the operation of which is like that of controller 86, previously described. In this case the controller produces a pressure proportional to a signal from the temperature sensing element 119 which senses the temperature of water flowing out of the heat exchanger to the dye chamber. Normally the three-way valve 127 is arranged so that the flow continues through filter 128 and orifice 129 into the dye tank, but the valve 127 may be positioned so that flow of the heated dye mixture is diverted back into the tank so that, for example, if it is desirable to pre-heat the dye during mixture this can be done without passing it through the dye chamber. The operation of the orifice 129 and the lights 132, 133 has been previously explained and constitutes a simple arrangement for determining whether the proper rate of dye is flowing to the dyeing chamber. The dye flow is subdivided at a T so that it flows through arms 48 and sprays out nozzles 49 within the dye chamber 47. The nature of the articles dyed is not of particular importance, but articles having typical dyeing problems solved by this system are ladies' nylon hose. Ladies' hose offer considerable challenge to the dyer because the material is particularly difficult to dye and because they are sold in pairs require close matching of colors.

In this particular version of the invention excess dye is sprayed onto the articles to be dyed and the excess dye is accumulated in the bottom of dye tank 47. The purpose of this accumulation is to maintain a flooded pump suction so that the pump flow will be continuous and with sufficient head to prevent pump cavitation. As previously explained, the float 139 controls air control 138 which actuates throttle valve 136 to restrict flow as necessary to maintain this flooded condition.

Most of the dye accumulated in the bottom of dye tank 47 is recirculated through line 146 back to supply chamber 15. However, a portion of the dye is not returned under usual conditions of operation in order to maintain constant the color of non-dyeing substances as previously described. Complete exhaust through line 144 to waste may occur when the dye color is intentionally changed by opening valve 145. However, all the dye is not necessarily passed to waste when changing color unless the change is from a darker to a lighter shade.

In starting up the system or in changing colors, the dye to be used may be mixed according to formula in tank 54. Weighed dyes are introduced into tank 54 through hand hole 165 according to formula. Water is added from line 159 through valve 160 and mixer motor 164 is started. Valve 56 is set to conduct fluid through line 158 and pump 150 is operated to cause circulation. Temperature control 166 is set so that in response to temperature indicator 156 it will cause valve 154 to admit the proper amount of steam to heater 152 to heat the circulating dye to the desired temperature. When the dye is thoroughly mixed and at the desired temperature, it may be transferred to chamber 15 through line 157 by changing the position of valve 56′. Valve 109 should be opened. Then by setting the color comparator for the new shade, the proper color will be maintained by the addition of dye components and water as required.

When it is desirable to change colors, and the end of the line of articles to be dyed a particular color is in view, the manual water supply valve 109 is closed and the contents of the mix chamber 15 are drained through an exhaust port in the bottom of the chamber by opening the valve 148. The salvaged dye is prevented from returning to chamber 15 by opening valve 145 and passing it to waste. Supply chamber is permitted to empty itself by supplying the dye as needed. During this process, the new dye mixture previously mixed and prepared in tank 54 can be permitted to flow into chamber 15 through line 157 after chamber 15 has been thoroughly emptied and the valve 148 closed. Valve 145 may not be closed until the new color begins to flow. When chamber 16 is empty, however, valve 109 is opened so that the new dye will also overflow into chamber 16.

When valve 56' is turned to permit flow through line 157 to mix chamber 15, valve 109 is opened to permit the flow of water therein so that as supply chamber is being emptied the mix chamber will be preparing to supply the supply chamber with the proper color of dye for the next line of articles of articles to be dyed. After the last line of articles is completed the remaining contents of supply chamber 16 may be drained through exhaust line 111 by opening valve 112.

It will be appreciated by those skilled in the art that the system even as illustrated in Figs. 2a and 2b is highly schematic and contains a minimum of elements. It will also be obvious to those skilled in the art that certain elements may be replaced by their equivalents or that a rearrangement of the positions of elements and the conduits interconnecting them is possible within the scope of the present invention.

Figure 3:
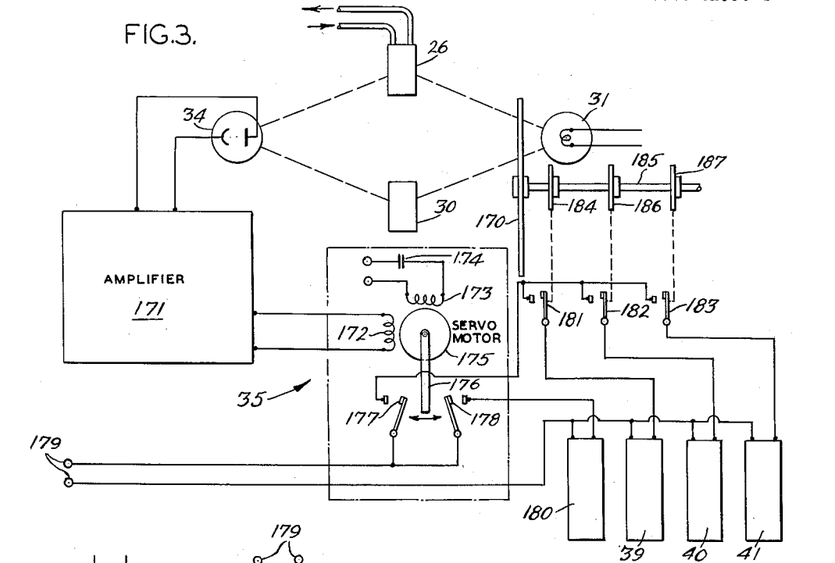
Fig. 3 is a schematic drawing showing one possible actuation system for the valves.
Figure 4:
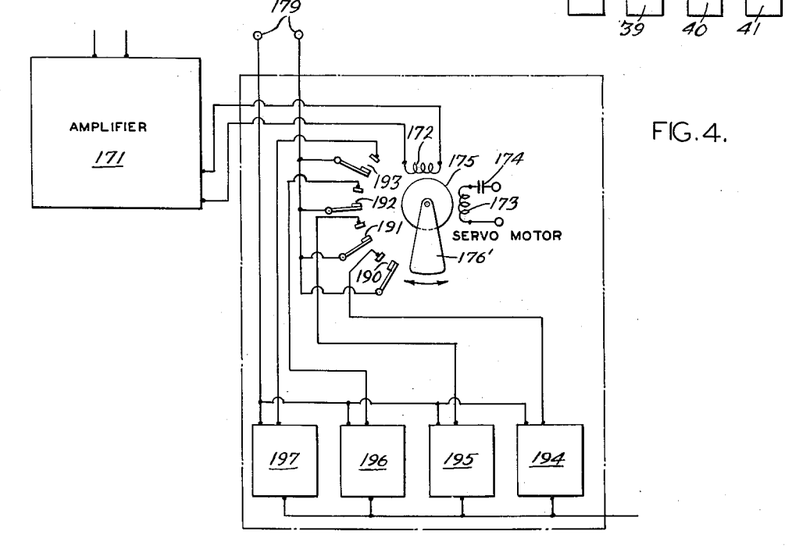
Fig. 4 is a schematic drawing showing how the system of Fig. 3 may be modified to add color constituents in proportion to their deficiencies.

Various actuation systems represented by the box 35 in Fig. 1 are possible within the scope of the present invention. These actuation systems employ components which are commercially available and well known. By way of illustration, and not by way of limitation, two such devices are shown in Figs. 3 and 4. The system shown in Fig. 3 is intended to be a system in which a fixed amount of color constituent or dilutent is added in response to a signal showing deficiency, and in Fig. 4 a modification of the system of Fig. 3 is illustrated whereby the amount added may be varied in proportion to the deficiency indicated.

Referring to Fig. 3, the relationship of the sample comparison system to the control system 35 is shown. Here it is clear that the light passing from light source 31 is sequentially colored by a filter wheel 170 of the type shown and described in the aforementioned applications before being split into separate beams passing through sample cell 26 and standard 30 and being subsequently compared at photocell 34. The signal from the photoelectric cell 134 is fed to a photoelectric amplifier 171 of a 60 cycle A.C. type, as described in the copending applications. The nature of this signal is such that it will be in phase with the power supply line current if the dye solution is too weak and color has to be added, or 180° out of phase with the power supply line current if the dye solution requires dilution because the dye constituents are too strong. The output from the amplifier is fed to a field winding 172 of a servomotor having a second phase winding in which the line current is shifted 90° out of phase by a capacitor 174. The armature 175 of the servo motor is spring loaded to a neutral position and is moved out of that position by the effect of current in winding 172. As illustrated, if the signal is produced by an under strength condition, so that additional dye or color constituent is called for, the signal will drive the armature of the motor clockwise, and if driven sufficiently far by a signal of sufficient strength, an actuator 176 on the shaft of the armature will close switch 177. If the armature is driven the other direction, due to an over strength signal, the actuator 176 will close switch 178. It will be seen that by closing switch 178 the power from terminals 179 will be applied across the terminals of a solenoid actuator 180 which opens a valve permitting dilutent to be added. In water soluble dyes the dilutent would be water and its addition would tend to dilute the dyes and hence make them less intense.

If the switch 177 were closed, any one of the actuating solenoids 39, 40 or 41, permitting addition of red, yellow or blue color constituents, respectively, would be energized, provided its associated switch 181, 182 or 183 were closed, thus completing the circuit from terminals 179 through switch 177 and the appropriate switch 181, 182 or 183 to the appropriate valve solenoid 39, 40 or 41. Selection of switches 181, 182 and 183 is dependent upon the position of filter wheel 170, and in this diagram it is supposed that filters have been matched to the dyes so that when one filter intercepts a light beam the deficiency of yellow is indicated and when another intercepts the beam a deficiency of red is indicated, and when another intercepts the beam a deficiency of blue is indicated. It is possible to have more complex systems in which multiple switch actuation is required, but the essence of the operation is more easily understood by the simple system illustrated here. Thus, for example, if the filter used for measuring a deficiency of yellow dye is intercepting the light beam at a particular time, a cam 184 on shaft 185 will close switch 181. Then if a deficiency in yellow actually exists, the signal received at servomotor 175 will cause switch 177 to close and valve 39 will be energized and add yellow dye. Similarly, a cam 186 closes switch 182 when the filter for indicating a deficiency of red is in position, and if a deficiency occurs, the circuit through switch 182 to energize valve actuating solenoid 40 will be closed through switch 177. When the filter wheel is in position to indicate a deficiency in blue dye, cam 187 closes switch 183 and, if a deficiency exists, servo motor 175 will close switch 177 thus actuating valve actuating solenoid 41.

In the system shown and described in connection with Fig. 3, a fixed amount of dye material or dilutent is added to the dye regardless of the amount of deficiency. In some cases it is desirable that where deviation is small, a small amount of dye be added, and where deviation is great, a large amount of dye be added. Fig. 4 illustrates a modification of the structure within box 188 in Fig. 3 wherein the same numbers are used to designate corresponding parts and only different parts are designated by different numbers. In this case the actuator 176' is somewhat different in shape but essentially has the same function. The amount of displacement of the armature is proportional to the signal received from the amplifier, and this signal is proportional to the differences in light intensity indicating degrees of difference in the under strength of the dye. As before, signals of this type impressed on field core 172 will drive armature 175 in a clockwise direction but the distance of movement of the armature determines which switch, 190, 191, 192 or 193, is to be closed. If the dye is only slightly under strength, a relatively weak signal will be received from amplifier 171, and the actuator 176' will be moved only as far as switch 190. Closing this switch will enable the closing of the appropriate valve by circuitry similar to that shown in Fig. 3, but in this case through a time delay relay 194. The delay in this case would be perhaps three seconds for a four second interval, so that the relay would close only after the third second and leave only one second of actuation for the particular valve selected by the appropriate cam actuated switch (see Fig. 3). If the signal were slightly greater, indicating somewhat more dilutent condition, the servo motor might close switch 191 causing time delay relay 195 to be effected, and cause a delay of perhaps only two seconds. Similarly, closing switch 192 might cause a delay through relay 196 of only one second and, finally, closing switch 193 would cause a delay through relay 195 of something less than one second or perhaps even no delay at all. In this way, the size of the signal indicating deviation from the standard would permit response or addition of color constituents in proportion to the need.

It will be appreciated that in the above description the switches described are normally open switches unless otherwise identified and are spring loaded so that when the actuator is removed the switch will tend to open. Thus, in the case of actuator 176' the actuator needs to be designed to hold one switch closed until the next switch is ready to be closed in order to assure that in all positions of the servo motor at least one time delay relay is effected. It is understood, of course, that in the structure of Fig. 4 a dilutent switch might be positioned in position corresponding to the position of switch 178 in Fig. 3, but it will equally well be understood that in some instances the system may not require the addition of a dilutent, and the dilutent as well as its associated system may be omitted. It will also be understood that considerable modification in the systems described is possible, and entirely different arrangements for accomplishing the same purpose are intended to be included within the scope of the present invention.

Figures 5, 6:
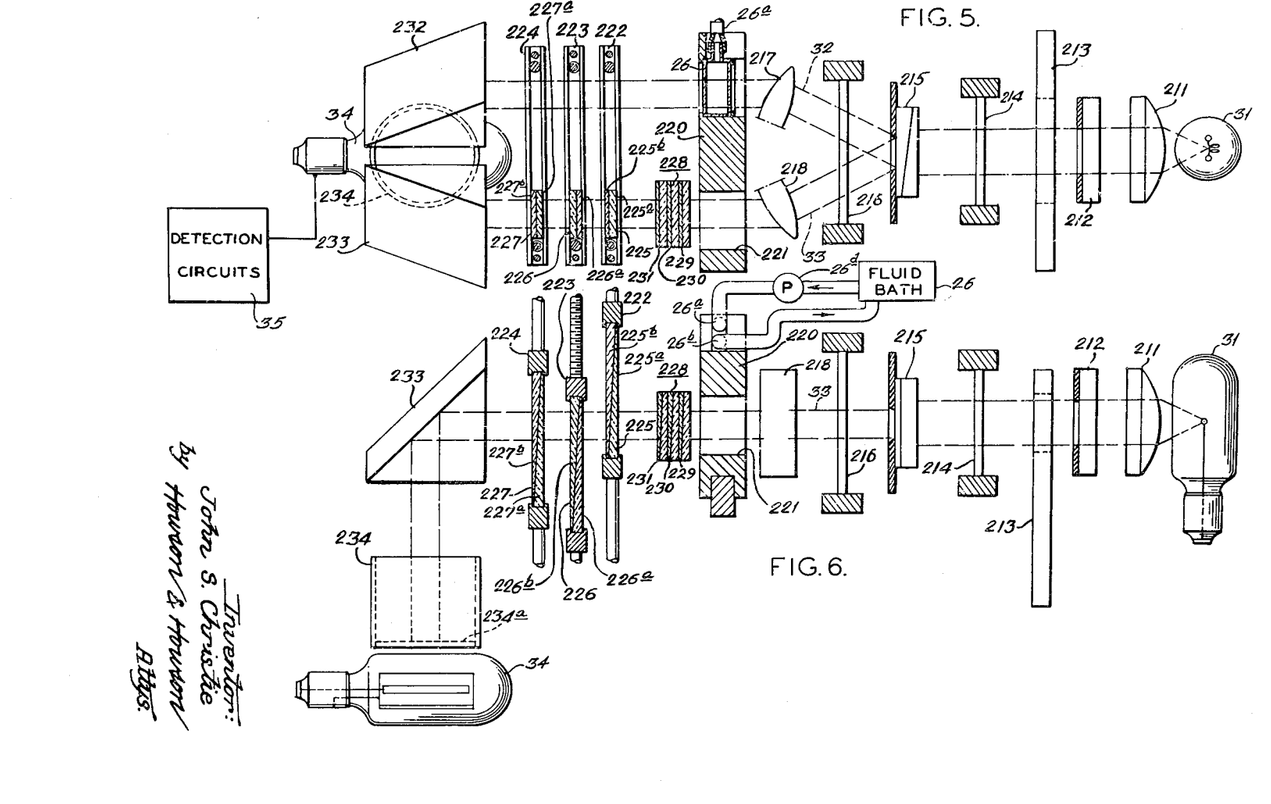
Fig. 5 is a generally diagrammatic plan view of one system of monitoring or error detection in accordance with the present invention.
Fig. 6 is a similar elevational view of the system shown in Fig. 5.

The system shown in Figs. 5 and 6 is that shown in Figs. 1 and 2 of my United States Patent 2,934,172. Said system is also described in my co-pending U.S. application Serial No. 714,990, filed February 13, 1958. In the latter application there is given a full discussion of the technique of comparison and error detection. While the present invention is concerned with the use of this error detection or monitoring system, it is but a component or system building block, and its arrangement and operation might be described as illustrative of how this component might function in the overall equipment.

In the system of Figs. 5 and 6 light from a source 31 is converged into a parallel beam by condensing lens 211 and passes through a heat absorbent element 212. The light beam then passes through a color filter wheel or disc 213 which is driven at a constant speed and which, in the case of a tricolor system, has three monochromatic filters arranged to be brought successively and sequentially into the path of the light beam. In the system presently employed, the color filter wheel is driven at the speed of 5 r.p.m., but it may be driven at any suitable speed. The light beam next passes through a partially polarizing filter 214 which is rotationally adjustable for a reason which will appear presently. The beam next passes through a Wollaston prism 215 which splits the beam into two divergent light beams 32 and 33, and which also plane polarizes the beams so that the beam 32 is polarized in a plane inclined at 90° to the plane of polarization of beam 33. Element 216 is a rotating polarity-responsive filter whose plane of polarization rotates. When its plane of polarization is parallel to the plane of polarization of either beam path 32 or 33 it passes a maximum amount of the light of that beam and when its plane of polarization is at right angles to the plane of polarization of either beam 32 or 33 it does not pass any of the light from that beam. At other angles, the light which passes is proportional to the sine of the angle. Due to the rotation of the polarity-responsive filter 126, the intensity of the light in each of the beams reaches a maximum and a minimum twice during each revolution, and since the two light beams are plane polarized 90° apart, there is a 90° time or phase relation between the beams. Thus the intensity of the two beams may be represented as sine waves with a 90° time or phase displacement between them.

Element 216 may be a Nicol prism, but in the system now being employed it is composed of two glass plates with a plastic or gelatin based polarizing filter element sandwiched between them. In the system now being employed, element 126 is mounted in a large diameter ball bearing and is driven through a toothed belt by a synchronous motor to insure synchronous speed. However, it could be mounted directly in a hollow shaft synchronous motor.

The divergent beams 32 and 33 are converted to parallel beams by segmented cylindrical lenses 217 and 218. Beam 32 then passes through a cell 26, a sample holder through which the dye solution being monitored is circulated. The dye solution comes from a dye bath 26c, represented schematically only in Fig. 6 by a block, to which the sample cell is coupled by hose connection 26a through a pump 26d or other appropriate means to produce continuous flow from the bath to the sample holder. Connection 26b permits the fluid to flow out, either back to the bath or elsewhere. Cell 26 is mounted in a block 220 which has an aperture 222 through which the beam 33 may freely pass. In prior art color comparator systems the beams were passed through a static standard sample and analyzer samples, respectively, and the analyzer samples were adjusted until balance occurred.

The monitoring system of the present invention may alternately employ an adjustable or a fixed standard. The fixed standard is a transparent standard of the desired color of the bath and may be provided by many structures, including a fluid standard. However, experience has shown that a standard having elements adjustable to a position fixed during operation simulating the colors of the fluid bath is extremely useful, particularly if calibrated so as to enable reproduction of any selected color. Such a device permits use of the same standard for many colors and yet permits a high degree of precision in the color monitoring of any desired color.

In accordance with this invention, a preferred fixed standard employs three units, 222, 223 and 224 which comprise respectively adjustable plates 225, 226 and 227. While these plates may be disposed as shown, it would be preferable to have them in the same plane as cell 26, so as to make the optical paths of the two beams more nearly alike. Each of these plates is of uniform thickness and is formed by two complemental solid sections of oppositely varying thickness having planar meeting surfaces extending diagonally of the plate thickness and secured together at said surfaces, one of said sections being composed of clear material and the other of said sections being composed of colored material, the colored sections of the plates being respectively different in color. Thus plate 225 has a colored section 225a and a clear section 225b; plate 226 has a colored section 226a and a clear section 226b; and plate 227 has a colored section 227a and clear section 227b. These plates may be formed of glass segments cemented together along the diagonal plane. The respective colors of the colored segments may be red, yellow and blue, or any other colors giving the range of colors desired in the bath. It will be seen that each plate is a color filter, with color density increasing from one end to the other. As hereinafter described, the plates are individually adjustable to simulate compositely the desired color of the dye solution or other fluid bath.

It will be seen that the transmitted light of beam 33 will not be of uniform intensity at all points in the light beam, as the transmittance of the filter plates is greater toward the thin end of the tapered colored section. It is preferable to correct this by first passing the beam through a set of three similar compensating filter plates with tapered colored sections arranged in opposite relation to those of plates 225 and 227. Thus there is preferably provided a compensating unit 228 having differently colored tapered section 229 to 231 which taper in the opposite direction from the colored section of plates 225 to 227. Unit 228 may be formed as a block with tapering clear section and a tapering colored section cemented together to form the block.

After passing respectively through the sample cell 26, and the color standard 30 comprising plates 225 to 227 and the two light beams 32 and 33 are redirected convergently downward by tilted prisms 232 and 233 through tube 234 onto a ground glass disk 234a at the bottom of said tube. If the light transmissions of the two beams 32 and 33 are equal, the illumination of the disk is substantially constant, because the light intensity of one beam decreases as that of the other beam increases, and vice versa. However, the unequal transmission in the two beams 32 and 33 causes light pulses which produce an output from phototube 34, which in turn activates detection circuits 35 which give an indication of the unbalanced condition and produce an error signal.

In the system presently employed, element 216 is conveniently driven at a speed of 1800 r.p.m., a speed easily available from the 60 cycle per second frequency of the supply line from which the electrical circuits are operated. Thus the pulsating output of the phototube 34, when such output occurs, is synchronized with the supply current. This is useful in operation of the correction circuits. For example, the output of phototube 34 as detected by circuitry 35 is conveniently applied to the correction circuits in timed sequence with the filters for operation of valves in supply lines of color constituents needed to make up a deficiency discovered in light of a particular frequency.

The possibility of adjusting the color standard to compensate for a non-dyeing colored material such as the dispersing agent has been previously discussed and inasmuch as the method of handling the addition of color to the standard will vary from case to case, it is deemed sufficient here to point out that there are broadly several possible solutions to the problem within the scope of the invention.

Many modifications of the present invention will occur to those skilled in the art. All such modifications within the scope of the claims are intended to be within the scope and spirit of the present invention.

I claim:

1. A system for mixing colored liquids to obtain a predetermined standard color comprising a mix chamber, a plurality of tanks to contain liquids of different component colors, a liquid dilutent supply, conduits connecting the tanks and the dilutent supply to the mix chamber, a valve in each conduit for controlling the flow of liquid from its associated tank to the chamber, a color monitoring device coupled to the mix chamber and adapted to sequentially examine the constituent color components of the mixed liquid and to respond in like sequence to any deviation from the proper amount of each component color needed to make the standard color, and separate couplings between each valve and the color monitoring device whereby the response of the monitoring device to any deviation from any component color actuates the valve in the conduit leading from the supply of liquid required to correct the color deviation.

2. A system for mixing colored liquids to obtain a predetermined standard color comprising a mix chamber, a plurality of tanks to contain liquids of different component colors, a liquid dilutent supply, conduits connecting the tanks and the dilutent supply to the mix chamber, a valve in each conduit for controlling the flow of liquid from its associated tank to said mix chamber, a sample cell, means for circulating mixed liquid from said chamber through said sample cell and back to said chamber, a color monitoring device associated with the sample cell and adapted to sequentially examine the constituent color components of the sample to respond in like sequence to any deviation of the sample flowing through the sample cell from the proper amount of each component color needed to make the standard color, and separate couplings between each valve and the color monitoring device whereby the response of the monitoring device to any deviation from any component color actuates the valve in the conduit leading from the supply of liquid required to correct the color deviation.

3. A system for mixing colored liquids to obtain a predetermined standard color comprising a mix chamber, a plurality of tanks to contain liquids of different component colors, a liquid dilutent supply, conduits connecting the tanks and the dilutent supply to the mix chamber, a sample cell, a valve in each conduit for separately controlling the flow of liquid from its associated tank to the chamber, a color monitoring device associated with the sample cell and adapted to sequentially examine the constituent color components of the sample and to respond in like sequence to any deviation in the sample flowing through the sample cell from each component color needed to make the standard color and separate couplings between each valve and the color monitoring device whereby the response of the monitoring device to any deviation from any component color actuates the valve in the conduit leading from the supply of liquid required to correct the color deviation.

4. An article dyeing system, comprising a dyeing chamber, mix and supply chambers for the dye together with means for circulating mixed dye solution from said supply chamber to said dyeing chamber and thence to said mix chamber, a plurality of tanks to contain dye solutions of different colors, conduit means connecting said tanks to said mix chamber for supply of the different colored dye solutions to the mix chamber, valves for controlling the flow of dye solution from each of said tanks to said mix chamber, a color monitoring device coupled to the mix chamber and adapted to sequentially examine the constituent color components of the sample and to respond in like sequence to any deviation in the mixed liquid dye from each component color needed to make a standard color, and separate couplings between each valve and the color monitoring device whereby the response of the monitoring device to any deviation from any component color actuates the valve in the conduit leading from the tank containing liquid dye solution of that component color.

5. An article dyeing system comprising a dye chamber, mix and supply chambers for the dye together with means for circulating the mixed dye solution from said supply chamber to said dye-applying chamber and thence to said mix chamber, a plurality of tanks to contain dye solutions of different colors, conduit means connecting said tanks to said mix chamber for supply of the different colored dye solutions to the mix chamber, valves for controlling the flow of dye solution from each of said tanks to said mix chamber, a sample cell, means for circulating mixed dye solution from said mix chamber through said sample cell and back to the mix chamber, a color monitoring device associated with the sample cell and adapted to sequentially examine the constituent color components of the sample and to respond in like sequence to any deviation of the sample flowing through the sample cell from the proper amount of each component color needed to make the standard color, and separate couplings between each valve and the color monitoring device whereby the response of the monitoring device to any deviation from any component color actuates the valve in the conduit leading from the tank containing liquid dye solution of that component color.

6. An article dyeing system comprising a dyeing chamber, mix and supply chambers for the dyes together with means for circulating the mixed dye solution from said supply chamber to said dye-applying chamber and thence to said mix chamber, a plurality of tanks to contain dye solutions of different colors, conduit means connecting said tanks to said mix chamber, valves for controlling the flow of dye solution from each of said tanks to said mix chamber, a sample cell, means for circulating mixed dye solution from said mix chamber, through said sample cell and back to the mix chamber, an adjustable color standard for simulating a wide range of colors, a color monitoring device associated with the sample cell and adapted to sequentially examine the constituent color components of the sample and to respond in like sequence to any deviation of the sample flowing through the sample cell from each component color needed to make the standard color, and separate couplings between each valve and the color monitoring device whereby the response of the monitoring device to any deviation from any component color actuates the valve in the conduit leading from the tank containing liquid dye solution of the component color.

7. The system of claim 1 in which each valve in the respective conduits from the component color liquid tanks to the mix chamber is adapted to open only briefly upon indication of deficiency of its particular color to add an increment of standard size to the mixture.

8. The system of claim 1 in which each valve in the respective conduits from the component color liquid tanks to the mix chamber is adapted to open for a period proportional in length to the deficiency of that color in the mixture.

9. The system of claim 1 in which each valve in the respective conduits from the component color liquid tanks to the mix chamber is adapted to open an amount proportional to the deficiency in the mixture.

10. In the dyeing system of claim 4, a separate tank for fluid which will counteract the natural pH to produce a dye solution within an acceptable pH range, a conduit from the separate tank to the mix chamber, a valve in the conduit, a test cell producing a response proportional to pH coupled ot the mix chamber to receive a sample of the dye mix and a coupling between the response producing test cell and the valve to actuate the valve to permit flow of neutralizing fluid into the mix chamber.

11. In the dyeing system of claim 4, in the circulating system beyond the supply chamber and before the dyeing chamber a regulatable heater and a temperature detection device, whereby in response to the temperature of the dye mix a uniform temperature of the dye mix as it enters the dye-applying chamber may be obtained.

12. The method of obtaining a mixture of color from component fluids comprising continuously monitoring the color of the mixture by sequentially examining it constituent color components to determine deviations of each of the color components of the mixture from the corresponding component color of the standard and alternatively feeding into the mixture, as required, diluent and component fluids of such components as deviate from the standard until the deviation is corrected.

13. The method of claim 12 in which monitoring is accomplished by comparison with a standard adjustable to simulate various color intensities.

14. The method of maintaining at a standard color a colored dye mixture which is re-used by adding component dye fluids to the mixture comprising continuously monitoring the color of the mixture by sequentially examining its constituent color components to determine deviations of each of the color components of the colored dye from the correspnding component color of a standard adjustable to simulate various color intensities, and feeding into the mixture component fluids of such components as deviate from the standard until the deviation is corrected.

15. The method of claim 14 in which non-dyeing colored fluids are added, the amount of the non-dyeing fluids is maintained constant by metering out of the system an amount of the used mixture which will dispose of as much of the non-dyeing fluid as is added with dye components and the standard is adjusted to compensate for non-dyeing colored fluids by increasing the intensity over the desired standard color of each component.

16. The method of claim 14 as applied to dyeing in which non-dyeing colored material is separately monitored and the standard is adjusted to compensate for it.

17. The method of claim 14 as applied to dyeing in which the way non-dyeing colored material is known to build up is applied to automatically adjust the standard in the course of operation.

18. The method of correcting the color of a monitored fluid to a desired color comprising placing in a light beam a standard to simulate the desired fluid color, withdrawing a sample of predetermined size from the bath, constantly changing the fluid sample, placing the sample in another light beam, sequentially changing the frequency band of light simultaneously in both beams, continuously comparing the light beams after passing through the sample and the standard to detect deviation of the predetermined relative light intensities of the beams which obtains when the sample matches the color represented by the standard for each frequency range and, upon detection of deviation of intensity in any frequency range, adding to the fluid bath color constituents of the color being compared in a given frequency range to restore the color of the standard to the fluid bath.

19. The method of claim 18 in which the frequency bands sequentially selected correspond to the maximum absorbence of the component fluid colors in the sample.

20. The method of claim 18 in which the colors are added in proportion to the deficiency detected.

21. The method of claim 18 in which the colors are added in equal quantities of predetermined size at each determination of deviation until the sample shows correction.

References Cited in the file of this patent
UNITED STATES PATENTS

| | | |
|---|---|---|
| 1,960,615 | Baker | May 29, 1934 |
| 1,996,233 | Darrah | Apr. 2, 1935 |
| 2,060,186 | Basil | Nov. 10, 1936 |
| 2,171,409 | Smith | Aug. 29, 1939 |
| 2,227,926 | Drum | Jan. 7, 1941 |
| 2,420,729 | Weber | May 20, 1947 |
| 2,630,002 | Converse | Mar. 3, 1953 |
| 2,676,478 | De Marco | Apr. 27, 1954 |
| 2,682,801 | Davidson | July 6, 1954 |
| 2,772,779 | Norris | Dec. 4, 1956 |

UNITED STATES PATENT OFFICE
CERTIFICATE OF CORRECTION

Patent No. 2,979,066                          April 11, 1961

John S. Christie

It is hereby certified that error appears in the above numbered patent requiring correction and that the said Letters Patent should read as corrected below.

Column 5, line 63, for "38" read -- 83 --; column 10, line 23, for "excess" read -- , the --.

Signed and sealed this 10th day of October 1961.

(SEAL)
Attest:

ERNEST W. SWIDER
Attesting Officer

DAVID L. LADD
Commissioner of Patents
USCOMM-DC